United States Patent [19]

Gabutti

[11] Patent Number: 4,861,861

[45] Date of Patent: Aug. 29, 1989

[54] SATURATED POLYESTERS CONTAINING IMIDE GROUPS AND TERMINAL CARBOXYL GROUPS

[75] Inventor: Claudio A. Gabutti, Therwil, Switzerland

[73] Assignee: Ciba-Geigy Corporation, Ardsley, N.Y.

[21] Appl. No.: 82,706

[22] Filed: Aug. 7, 1987

[30] Foreign Application Priority Data

Aug. 19, 1986 [CH] Switzerland .......................... 3321/86

[51] Int. Cl.[4] ............................................. C08G 63/02
[52] U.S. Cl. .................................... 528/272; 528/289;
528/290; 528/302; 528/308; 528/318; 528/319
[58] Field of Search ............... 528/289, 272, 290, 302, 528/308, 318, 319

[56] References Cited

U.S. PATENT DOCUMENTS

| | | | |
|---|---|---|---|
| 3,454,673 | 7/1969 | Schmidt et al. ...................... | 525/445 |
| 4,233,220 | 11/1980 | Kvita et al. .......................... | 548/521 |
| 4,267,232 | 5/1981 | Schmidt et al. ...................... | 428/379 |
| 4,446,301 | 5/1984 | Belote et al. ........................ | 528/295.3 |

OTHER PUBLICATIONS

Derwent Abstract 56967t of U.S.S.R. Patent No. 318,227 (1972).
CA 93:133328e (1980).

Primary Examiner—John Kight
Assistant Examiner—S. A. Acquah
Attorney, Agent, or Firm—JoAnn Villamizar

[57] ABSTRACT

Saturated polyesters containing terminal carboxyl groups and, per molecule, at least one side chain, containing imide groups, of the formula I

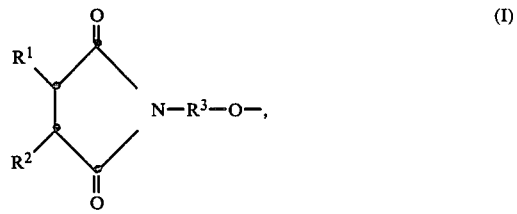

in which $R^1$ and $R^2$, for example, together with the carbon atoms to which they are attached, are a cyclohexane ring and $R^3$ is ethylene, the side chains of the formula I being attached via ester linkages to tribasic or tetrabasic aromatic carboxylic acids present in the polyester main chain, the average molecular weight $\overline{M}_w$ of the polyester being between 3,000 and 20,000 and the polyester having an acid number of 10 to 200. The polyesters are suitable, for example as a composition containing epoxide resins, for use as casting resins or in surface protection, particularly for the preparation of heat-resistant and weather-resistant powder paints.

18 Claims, No Drawings

SATURATED POLYESTERS CONTAINING IMIDE GROUPS AND TERMINAL CARBOXYL GROUPS

The invention relates to saturated polyesters containing terminal carboxyl groups and, per molecule, at least one side chain containing imide groups, to the curable compositions containing epoxide resins obtained therefrom and to the use of these compositions, particularly for the preparation of heat-resistant and weather-resistant powder paints.

Polyesters containing imide groups are known.

Thus USSR Patent Specification No. 318,227 and German Auslegeschrift No. 1,570,273 describe unsaturated polyesters prepared by subjecting dicarboxylic acids and polyhydric alcohols to polycondensation in the presence of a dicarboxylic or polycarboxylic acid imide as a modifying agent. These modified unsaturated polymers are cured, for example in the presence of styrene, by means of butyl perisooctoate and cobalt naphthenate.

German Offenlegungsschrift No. 2,856,050 describes a process for the preparation of unsaturated polyesters containing imide groups, in which unsaturated oils are employed as the starting material. The polyesters thus obtained are used for the preparation of copolymers with olefinically unsaturated monomers, for example vinyl compounds.

U.S. Pat. No. 4,446,301 describes polyesters containing imide or amide groups, obtained as the reaction products from an imide or amide, a polyester-forming polyol and a polyester-forming polybasic carboxylic acid or derivatives thereof and, if appropriate, an oil or an unsaturated fatty acid derived from an oil. The imides or amides used are, in turn, prepared from specific branched primary alkanolamines and polycarboxylic acids or derivatives thereof. The imide or amide groups can be constituents of the polyester main chain or can be present as side chains. The polyesters are particularly suitable for the preparation of air-drying paints of high solids content and also certain inks.

The present invention relates to saturated polyesters containing terminal carboxyl groups and, per molecule, at least one side chain, containing imide groups, of the formula I

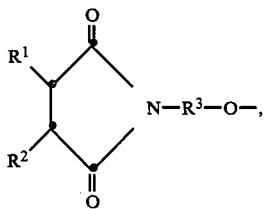
(I)

in which $R^1$ and $R^2$ independently of one another are each hydrogen or a $C_1$–$C_4$-alkyl group or, together with the carbon atoms to which they are attached, are a cyclopentane, cyclohexane or benzene ring, and $R^3$ is a linear $C_2$–$C_{12}$-alkylene radical, a $C_6$–$C_{12}$-arylene radical or a group of the formula II

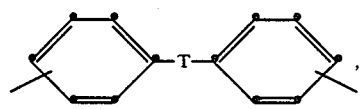
(II)

in which T is methylene, propylidene, NH, CO, $SO_2$, O or S, the side chains of the formula 1 being attached via ester linkages to tribasic or tetrabasic aromatic carboxylic acids present in the polyester main chain, the average molecular weight $\overline{M}_w$ of the polyester being between 3000 and 20,000 and the polyester having an acid number from 10 to 200.

The polyesters according to the invention are suitable, for example, for the preparation of curable compositions which contain epoxide resins and which are suitable, in particular, for the production of heat-resistant and weather-resistant powder paints.

If $R^1$ and $R^2$ in the side chain of the formula I are a $C_1$–$C_4$-alkyl group, this can be methyl, ethyl, propyl, isopropyl and n-, sec.- and tert.-butyl.

The polyesters according to the invention preferably contain side chains of the formula I in which $R^1$ and $R^2$ independently of one another are hydrogen or methyl or, together with the carbon atom to which they are attached, are a benzene ring, and contain, in particular, side chains in which $R^1$ and $R^2$, together with the carbon atoms to which they are attached, are a cyclohexane ring.

If $R^3$ in the side chain of the formula I is a linear $C_2$–$C_{12}$-alkylene radical, this can be, for example, ethylene, 1,3-propylene, 1,4-butylene, 1,5-pentylene or 1,6-hexylene.

A $C_6$–$C_{12}$-arylene radical $R^3$ is, for example, phenylene, bisphenylene or naphthylene.

$R^3$ in the side chain of the formula I is preferably a linear $C_2$–$C_4$-alkylene radical, such as ethylene, 1,3-propylene or 1,4-butylene, or is phenylene, such as 1,2-phenylene, 1,3-phenylene and particularly 1,4-phenylene. $R^3$ is particularly preferably ethylene.

The polyester main chain of the polyesters according to the invention is built up by reacting one or more polyester-forming polyols with one or more polyester-forming, polybasic carboxylic acids or derivatives thereof. Examples of suitable derivatives of polyester-forming, polybasic carboxylic acids are anhydrides, acid halides, for example bromides or especially chlorides, or esters with $C_1$–$C_4$-alcohols, in particular methyl esters.

Preferred polyesters according to the invention are those in which 50 to 80 mol % of the polyester-forming, polybasic carboxylic acid component in the polyester main chain are derived from a dicarboxylic acid, and the remaining 50 to 20 mol % are derived from a tricarboxylic or tetracarboxylic acid. Suitable dicarboxylic acids are compounds of the formula III

(III)

in which $R^4$ is $C_6$–$C_{12}$-arylene, linear or branched $C_2$–$C_{12}$-alkylene, $C_6$–$C_{12}$-cycloalkylene or a group of the formula II.

Preferred radicals $R^4$ are $C_2$–$C_6$-alkylene, preferably tetramethylene, or are o-, m- or p-phenylene. The tricarboxylic or tetracarboxylic acids present in the polyester main chain are preferably compounds of the formula IV

(IV)

in which m is 3 or 4 and $R^5$ is a trivalent or tetravalent $C_6$–$C_{12}$-aromatic radical or a trivalent or tetravalent radical of the formula II.

The following may be mentioned as suitable polybasic, polyester-forming carboxylic acids: adipic acid, azelaic acid, 1,2-, 1,3- and 1,4-cyclohexanedicarboxylic acid, 1,2-cyclopentanedicarboxylic acid, l,3-cyclopentanedicarboxylic acid, glutaric acid, phthalic acid, isophthalic acid, terephthalic acid, biphenyl-di-, -tri- or -tetra-carboxylic acid, benzophenone-di-, -tri- or -tetra-carboxylic acid, naphthalenetetracarboxylic acid, 4,4'-oxy-, 4,4'-thio- or 4,4'-methylene-diphthalic acid, trimellitic acid and pyromellitic acid.

Preferred polybasic carboxylic acids of the formula IV are trimellitic acid and pyromellitic acid.

The polyesters according to the invention preferably contain, in the polyester main chain, at least 80 mol % of the polyester-forming polyol component of a diol, the remaining 0 to 20 mol % being the component of a triol or tetraol.

The polyol preferably has the formula V $$R^6(OH)_n \quad (V)$$

in which n is 2, 3 or 4 and $R^6$ is a divalent to tetravalent $C_6$–$C_{12}$ cycloaliphatic radical or $C_6$–$C_{12}$ aromatic radical, a divalent to tetravalent radical of the formula II or, in particular, a divalent to tetravalent, linear or branched, $C_2$–$C_{12}$ aliphatic radical.

Preferred polyols of the formula V are dihydric to tetrahydric aliphatic polyols, in particular ethylene glycol, propylene glycol, butylene glycol, 1,5-pentanediol, 1,6-hexanediol, neopentylglycol, glycerol, 1,1,1-tris-(hydroxymethyl)propane and 2,2-bis-(hydroxymethyl)-1,3-propanediol.

The most preferred polyols of the formula V are neopentylglycol and 1,6-hexanediol.

As already mentioned, the side chains of the formula I in the polyesters according to the invention are attached via ester linkages to tribasic or tetrabasic aromatic carboxylic acids present in the polyester main chain. The polyester therefore has the following repeating units

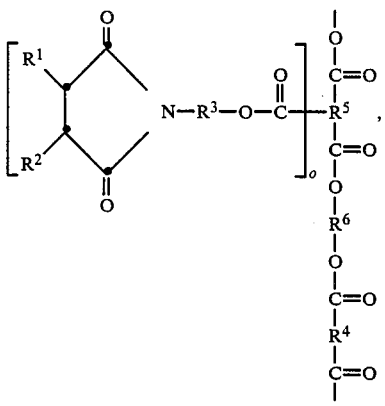

in which o is the number 1 or 2 and the radicals $R^1$, $R^2$, $R^3$, $R^4$ and $R^5$ are as defined above. For the sake of simplicity, only bifunctional polyol or polycarboxylic acid radicals $R^6$ and $R^4$ have been used in illustrating the repeating units of the polyester main chain.

The polyesters according to the invention can be prepared by known methods of polyester synthesis. The reaction is suitably carried out at elevated temperatures, for example between 120° and 250° C., preferably between 160° and 230° C., and in an inert atmosphere, such as nitrogen or argon. The reaction can be carried out with or without a catalyst. If a catalyst is used, it is possible to employ catalysts which are customary for the preparation of polyesters, for example catalytic amounts of acids or transition metal compounds, for example inorganic or organic compounds of antimony, titanium or tin. Examples of preferred catalysts are phosphoric acid, p-toluenesulphonic acid, tin oxide and organic titanium or tin compounds, for example alkyl tin carboxylates, such as dibutyltin dilaurate, and titanium carboxylic acid salts. In general, the catalyst is employed in an amount of 0.01 to 1% by weight, relative to the total amount of the educts.

It is suitable to carry out the reaction in such a way that the alkanolamine $H_2N$—$R^3$—OH is first reacted with an imide-forming dicarboxylic acid or a derivative thereof to give a hydroxyimide of the formula VI

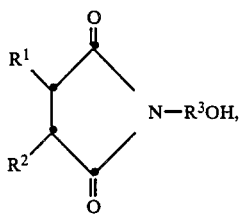

and then to esterify the compound of the formula VI with a tribasic or tetrabasic carboxylic acid of the formula IV $$R^5(COOH)_m \quad (IV)$$

or a derivative thereof to give a compound of the formula VII

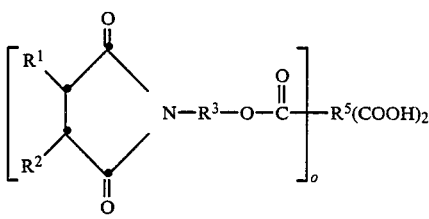

in which the radicals $R^1$, $R^2$, $R^3$ and $R^5$ and also the indices m and o are as defined above. The compounds of the formula VI and VII can each be isolated, but it is preferable to carry out the whole reaction in a one-pot process, by adding the appropriate educts to the reaction mixture one after the other and heating them together. The amount of the alkanolamine $H_2NR^3OH$ is preferably 2 to 15, in particular 3 to 10%, by weight, relative to the total weight of all the educts employed in the synthesis of the polyesters according to the invention. The reaction of the dicarboxylic acid of the formula VII with further polybasic, polyester-forming carboxylic acids or derivatives thereof and with polyols, in which the polyester main chain is formed, is carried out by the previously mentioned, known methods of polyester synthesis.

The progress of the reaction can be followed by determining the amount of distillate, for example water, formed in the course of the reaction, or by withdrawing samples of the reaction mixture at specific intervals of time and determining the properties of the polymer, for example the acid number, the molecular weight or the viscosity.

The reaction can be carried out without a solvent in the melt or in solution in a suitable inert solvent, for example toluene or xylene.

The polyester according to the invention has an average molecular weight $\overline{M}_w$ of between 3000 and 20,000, preferably between 3500 and 10,000, and an acid number of 10 to 200, preferably 30 to 100. The molecular weight can be determined, for example, by means of gel permeation chromatography in a suitable solvent, for example tetrahydrofuran.

The amount of the individual components in the synthesis of the polyester is preferably so chosen that at least two, particularly five to ten, side chains, containing imide groups, of the formula I are present per molecule of polyester.

The polyesters according to the invention are preferably solid at room temperature and have a softening point of about 80 to 150° C. In order to obtain polyesters having terminal carboxyl groups, it is possible for example, to react polymers having terminal hydroxyl groups with a tricarboxylic or tetracarboxylic acid or an anhydride thereof.

The polyesters according to the invention are suitable, for example, as curing agents for epoxide resins.

The invention therefore also relates to curable compositions containing
(a) a polyester according to the invention and
(b) an epoxide resin,
the amounts of the components (a) and (b) being so chosen that 0.5 to 2, preferably 0.8 to 1.5, epoxide groups of the epoxide resin are present per carboxyl group of the polyester.

The curable compositions according to the invention are suitable, for example, for use as casting resins or in surface protection and, particularly, for the preparation of heat-resistant and weather-resistant powder paints.

The invention also relates to the use of the curable compositions according to the invention for the preparation of powder paints.

Single-substance compounds or mixtures of different compounds can in each case be used as the components (a) and (b) of the compositions according to the invention.

The customary epoxide resins which are suitable for powder coatings can be used as the component (b). Compounds of this type are described, for example, in German Offenlegungsschrift No. 2,838,841.

The resins used preferably have an epoxide content of 0.5 to 12 equivalents per kg. The preferred epoxide resins are solid at room temperature and can, if necessary, be advanced by reaction with, for example, a dihydric phenol.

Epoxide resins which are particularly preferred are those which contain, on average, more than one epoxide group per molecule and are polyglycidyl derivatives of aromatic or heteroaromatic compounds.

Particularly preferred resins are optionally advanced polyglycidyl ethers of 2,2-bis-(4'-hydroxyphenyl)propane (bisphenol A), 2,2-bis-(3',5'-dibromo-4'-hydroxyphenyl)-propane (tetrabromobisphenol A), bis-(4-hydroxyphenyl)-methane (bisphenol F) and novolaks, and polyglycidyl derivatives of 4,4'-diaminodiphenylmethane, 4,4'-diaminodiphenyl sulfone and, in particular, 2,4,6-trihydroxy-1,3,5-triazine (cyanuric acid), for example triglycidyl isocyanurate. Preferred resins are also polyglycidyl esters, for example diglycidyl terephthalate or triglycidyl trimesate (=benzene-1,3,5-tricarboxylate).

The epoxide resin (b) and the polyester (a) are preferably so chosen that the sum of the epoxide equivalents and of the carboxyl equivalents is between 0.8 and 2.5 per kg of the binder (a)+(b).

If desired, further additives customary in the paint industry, for example extenders, light stabilizers, delustering agents, dyestuffs, grinding aids, accelerators, plasticizers and especially degassing agents, flow control agents and/or pigments can be added to the powder paints.

Examples of flow control agents are polyvinyl acetals, such as polyvinyl butyral ("Movital" B 30 H ®) made by HOECHST), polyethylene glycol, polyvinylpyrrolidone, glycerol and acrylic copolymers, such as "Modaflow" ® or "Acrylon" MFP ® made by MONSANTO and PROTEX, respectively.

Benzoin is preferably employed as the degassing agent.

The powder paints containing the compositions according to the invention can be prepared merely by mixing the ingredients, for example in a ball mill. Another possible means of preparation consists in combining the ingredients by melting, preferably in an extruder, for example in a Buss Kokneter, and then comminuting the cooled mass. The mixtures preferably have a particle size within the range from 0.015 to 500 μm, particularly 10–75 μm.

The powder paint is applied to the article to be coated, for example by means of an electrostatic powder spray gun and is advantageously heated to at least 120° C., preferably to 150° to 250° C., in order to cure the resin completely.

The cured coatings obtained in accordance with the application are distinguished by excellent resistance to heat and weathering. In particular, the cured powder-paint coatings prepared using the polyesters according to the invention do not undergo any thermal chalking when subjected to heat ageing.

The preparation of some polyesters according to the invention and of the powder paints obtainable therefrom and the use of the latter as heat-resistant and weather-resistant coatings is described in the following examples.

1. Preparation of the Polyesters

Example 1.1

168 parts by weight of hexahydrophthalic anhydride and 67 parts by weight of monoethanolamine are reacted under nitrogen at a temperature of 200° C. to give the imide, 211 parts by weight of trimellitic anhydride are then added and the mixture is kept at 200° C. for 30 minutes. 468 parts by weight of neopentylglycol and 524 parts by weight of isophthalic acid are added to this melt, and esterification is carried out up to a maximum temperature of 230° C., to give an acid number <50, 95.75 parts by weight of trimellitic anhydride are then added and esterification is again carried out to give an acid number of 52. The softening point of the product as specified in DIN 51,920 is 114.3° C. and the average molecular weight $\overline{M}_n$ is 1166 and $\overline{M}_w$ 4186 (gel permeation chromatography in THF on Styragel; calibration by means of polystyrene).

Example 1.2

168 parts by weight of hexahydrophthalic anhydride are reacted with 67 parts by weight of monoethanolamine analogously to Example 1, and the mixture is then reacted with 211 parts by weight of trimellitic anhydride. 468 parts by weight of neopentylglycol, 349 parts by weight of isophthalic acid and 153 parts by weight of adipic acid are added to this melt, and esterification is carried out up to a maximum temperature of 230° C. to give an acid number <50, 96 parts by weight of trimellitic anhydride are then added and esterification is carried out to give a product having an acid number of 57. The softening point of the product as specified in DIN 51,920 is 95.6° C. and the average molecular weight $\overline{M}_n$ is 1145 and $\overline{M}_w$ 4161 (gel permeation chromatography in THF on Styragel; calibration with polystyrene).

Example 1.3

168 parts by weight of hexahydrophthalic anhydride are reacted with 67 parts by weight of monoethanolamine analogously to Example 1, and the mixture is then reacted with 211 parts by weight of trimellitic anhydride. 313 parts by weight of neopentylglycol, 177 parts by weight of 1,6-hexanediol and 524 parts by weight of isophthalic acid are added to this melt, followed by 77 parts by weight of trimellitic anhydride. The product has an acid number of 52, a softening point as specified in DIN 51,920 of 107.9° C. and an average molecular weight $\overline{M}_n$ of 1329 and $\overline{M}_w$ of 6430 (gel permeation chromatography in THF on Styragel; calibration with polystyrene).

Example 1.4

305 parts by weight of hexahydrophthalic anhydride and 122 parts by weight of monoethanolamine are reacted under nitrogen to give the imide, 218 parts by weight of pyromellitic dianhydride are then added and the mixture is kept at 200° C. for 2 hours. 502 parts by weight of 1,6-hexanediol and 583 parts by weight of dimethyl terephthalate are added to this melt and esterification is carried out up to a maximum temperature of 233° C. to give an acid number <50, 48 parts by weight of trimellitic anhydride are then added and esterification is carried out to give a product having an acid number of 42.

2. Epoxide Resin

The epoxide compound employed in all the use examples is triglycidyl isocyanurate having an epoxide equivalent weight of ≦108, an epoxide number of ≧9.3 equivalents/kg and a melting range from 86° to 97° C.

3. Powder Paints

The powder paints are prepared by intimately mixing the ground products, polyester, epoxide resin and flow control agent with a white pigments (TiO$_2$) in a gyrowheel (Rhönrad), and then homogenizing the mixture in an extruder at 40° to 90° C. After cooling, the extruded material is broken up and ground to a particle size of <100 μm in a pinned disc mill. The powder prepared in this way is applied by means of an electrostatic powder spray gun at 60 kV to degreased steel sheets, and is stoved in a circulating air drying cabinet.

Example 3.1

A powder paint of the following formulation is prepared and applied by the procedure described.
900 parts by weight of polyester according to Example 1.1
100 parts by weight of epoxide resin according to Example 2
10 parts by weight of Modaflow-Powder II ® [1]
500 parts by weight of white pigment (TiO$_2$)
2 parts by weight of benzoin

[1] Flow control agent made by Monsanto, based on poly-(2-hydroxyethyl) acrylate adsorbed onto silica gel.

Stoving conditions: 30 minutes at 200° C.
Gel time (B-time) at 180° C.: 60 seconds
Film thickness (μm): 60
Erichsen indentation
(DIN 53,156) mm: 3.6
Acetone test* (rating): 2

* Acetone test: A wad of cottonwool dipped into acetone is placed for 1 minute on the sample sheet to be tested. Assessment: Rating 0=surface unaffected; 1=softening hardly noticeable, cannot be scratched with fingernail; 2=can be scratched by fingernail, but not to the bottom; 3=can be scratched to the bottom; 4=film can be removed or rubbed off with the wad; 5=virtually completely dissolved out.

|  | Helmen chalking value (DIN 53,223) | | | |
| --- | --- | --- | --- | --- |
|  | 120° C./ 24 hrs | 120° C./ 200 hrs | 120° C./ 1 month | 120° C./ 5 months |
| Relative % of chalking | 0 | 0 | 0 | 0 |

RESISTANCE TO WEATHERING

Testing by accelerated weathering on aluminium sheet using the Atlas *Weather-O-Meter*, model DCM (carbon arc lamp). The daily cycle in the test was as follows: 20 hours exposure in accordance with cycle disc No. 10 (17 minutes exposure, 3 minutes exposure and sprinkling), 1 hour's storage in tap water, 1 hour's cooling to −20° C. (frost) and 2 hours' storage at room temperature.

|  | Initial value | 1000 hrs. | 2000 hrs. |
| --- | --- | --- | --- |
| 60° angle gloss (%)(DIN 67,550) | 85 | 90 | 86 |
| Yellowness value (DIN 6167) | −2 | −2 | 1.8 |

Example 3.2

892 parts by weight of polyester according to Example 1.2
108 parts by weight of epoxide resin according to Example 2
10 parts by weight of Modaflow-Powder II ®
500 parts by weight of white pigment (TiO$_2$)
2 parts by weight of benzoin Stoving conditions: 15 minutes at 200° C.
(B-time) at 180° C.: 45 seconds
Film thickness (μm): 60
Erichsen indentation
(DIN 53,156) (mm): 9.3
Acetone test* (rating): 3

| Helmen chalking value (DIN 53,223) | | | |
|---|---|---|---|
| 120° C./ 24 hrs. | 120° C./ 200 hrs. | 120° C./ 1 month | 120° C./ 3 months |
| Relative % of chalking  0 | 0 | 0 | 0 |

What is claimed is:

1. A saturated polyester containing terminal carboxyl groups and, per molecule, at least one side chain, containing imide groups, of the formula I

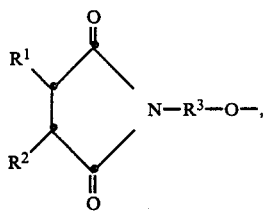

in which $R^1$ and $R^2$ independently of one another are each hydrogen or a $C_1$-$C_4$-alkyl group or, together with the carbon atoms to which they are attached, are a cyclopentane, cyclohexane or benzene ring, and $R^3$ is a linear $C_2$-$C_{12}$-alkylene radical, a $C_6$-$C_{12}$-arylene radical or a group of the formula II

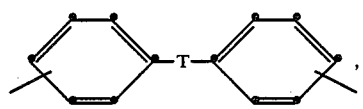

in which T is methylene, propylidene, NH, CO, $SO_2$, O or S, the side chains of the formula 1 being attached via ester linkages to tribasic or tetrabasic aromatic carboxylic acids present in the polyester main chain, the average molecular weight $\overline{M}_w$ of the polyester being between 3,000 and 20,000 and the polyester having an acid number from 10 to 200.

2. A polyester according to claim 1, wherein $R^1$ and $R^2$ independently of one another are hydrogen or methyl or, together with the carbon atoms to which they are attached, are a benzene ring.

3. A polyester according to claim 1, wherein $R^1$ and $R^2$, together with the carbon atoms to which they are attached, are a cyclohexane ring.

4. A polyester according to claim 1, wherein $R^3$ is a linear $C_2$-$C_4$-alkylene radical or is phenylene.

5. A polyester according to claim 1, wherein $R^3$ is ethylene.

6. A polyester according to claim 1, wherein 50 to 80 mol of the polyester-forming, polybasic carboxylic acid component in the polyester main chain are derived from a dicarboxylic acid and the remaining 50 to 20 mol % are derived from a tricarboxylic or tetracarboxylic acid.

7. A polyester according to claim 6, wherein the dicarboxylic acid has the formula III $$HOOC-R^4-COOH \qquad (III),$$

in which $R^4$ is $C_6$-$C_{12}$-arylene, linear or branched $C_2$-$C_{12}$-alkylene, $C_6$-$C_{12}$-cycloalkylene or a group of the formula II according to claim 1.

8. A polyester according to claim 7, wherein $R^4$ is $C_2$-$C_6$ alkylene or is o-, m- or p-phenylene.

9. A polyester according to claim 6, wherein the tricarboxylic acid or the tetracarboxylic acid has the formula IV $$R^5(COOH)_m \qquad (IV),$$

in which m is 3 or 4 and $R^5$ is a trivalent or tetravalent $C_6$-$C_{12}$ aromatic radical or a trivalent or tetravalent radical of the formula II according to claim 1.

10. A polyester according to claim 9, wherein the polybasic acid is trimellitic or pyromellitic acid.

11. A polyester according to claim 1, wherein at least 80 mol % of the polyester-forming polyol component in the polyester main chain are derived from a diol and the remaining 0 to 20 mol % are derived from a triol or a tetraol.

12. A polyester according to claim 11, wherein the polyol has the formula V $$R^6(OH)_n \qquad (V),$$

in which n is 2, 3 or 4 and $R^6$ is a divalent to tetravalent $C_6$-$C_{12}$ cycloaliphatic or $C_6$-$C_{12}$ aromatic radical, a divalent to tetravalent radical of the formula II according to claim 1 or a divalent to tetravalent, linear or branched, $C_2$-$C_{12}$ aliphatic radical.

13. A polyester according to claim 12, wherein the polyol is a dihydric to tetrahydric aliphatic polyol.

14. A polyester according to claim 13, wherein the polyol is neopentylglycol or 1,6-hexanediol.

15. A polyester according to claim 1, which contains 2 to 20, preferably 5 to 10, side chains of the formula I per molecule.

16. A polyester according to claim 1, which has an average molecular weight $\overline{M}_w$ of 3,500 to 10,000 and an acid number of 30 to 100.

17. A curable paint powder composition containing
(a) a polyester according to claim 1 and
(b) an epoxide resin,
the amounts of the components (a) and (b) being so chosen that there are 0.5 to 2 epoxide groups of the epoxide resin per carboxyl group of the polyester.

18. A composition according to claim 17, wherein the epoxide resin is triglycidyl isocyanurate.

* * * * *